United States Patent [19]

Sagoi et al.

[11] Patent Number: 4,629,660
[45] Date of Patent: Dec. 16, 1986

[54] PERPENDICULAR MAGNETIC-RECORDING MEDIUM

[75] Inventors: Masayuki Sagoi; Reiji Nishikawa, both of Yokohama, Japan

[73] Assignee: Tokyo Shibaura Denki Kabushiki Kaisha, Kawasaki, Japan

[21] Appl. No.: 588,881

[22] Filed: Mar. 12, 1984

[30] Foreign Application Priority Data

Mar. 28, 1983 [JP] Japan .................................. 58-51978

[51] Int. Cl.$^4$ ............................................. H01F 0/26
[52] U.S. Cl. ................................... 428/678; 428/680; 428/900; 428/928; 428/611; 428/615; 427/131; 427/132; 357/71
[58] Field of Search .............. 428/900, 928, 680, 678, 428/611, 615; 427/131, 132; 357/71

[56] References Cited

U.S. PATENT DOCUMENTS 4,013,534 3/1977 Ishii et al. ...................... 204/192 M
4,277,809 7/1981 Fisher et al. .......................... 428/900

FOREIGN PATENT DOCUMENTS 58-19731 2/1983 Japan .................................. 428/928

OTHER PUBLICATIONS

K. Kobayashi et al., Proceedings of 1982 Sendai Symposium on Perpendicular Magnetic Recording, Mar. 11-12, 1982, 177-187

European Search Report of Application No. 84102804.6.

*Primary Examiner*—Veronica O'Keefe
*Attorney, Agent, or Firm*—Oblon, Fisher, Spivak, McClelland & Maier

[57] ABSTRACT

A perpendicular magnetic-recording medium wherein an amorphous alloy layer of nickel and phosphorus is formed on a disc substrate; the surface of the alloy layer is smoothed with high precision; and a ferromagnetic Co-based perpendicular magnetic-recording layer is formed on the smoothed surface of the alloy layer.

8 Claims, 4 Drawing Figures

PERPENDICULAR MAGNETIC-RECORDING MEDIUM

BACKGROUND OF THE INVENTION

This invention relates to a perpendicular magnetic-recording medium and, more particularly, to a perpendicular magnetic disc and a method of manufacturing the same.

Recently, attention is drawn to high density perpendicular magnetic-recording effected by utilizing the residual magnetism retained in a plane perpendicular to the recording surface of a magnetic recording medium. A recording medium applied in said perpendicular magnetic-recording has hitherto been formed of a thin Co-Cr based layer prepared by sputtering. The reason is that said thin Co-Cr based layer has an axis of easy magnetization extending in a direction perpendicular to the plane of recording.

A hard disc for perpendicular magnetic-recording normally has its substrate prepared from an aluminum alloy. Aluminum alloy, however, is soft, so that its surface is anodized to provide a hard Alumite (trademark) layer. The surface of this Alumite layer is adapted for polishing, thereby providing an extremely smooth plane. But impurities contained in the aluminum alloy obstructs the stable formation of the Alumite layer. It was therefore necessary to rigidly control the purity of the aluminum alloy. A further problem was experienced in that even when the thin Co-Cr based layer was sputtered on the surface-anodized aluminum-alloy substrate, it was impossible to effect the C-axis dispersion adapted for perpendicular magnetization. In this connection, reference may be made to "Co-Cr Rigid Disc for Perpendicular Magnetic Recording", Sendai Symposium on Perpendicular Magnetic Recording (by Kazuo Kobayashi et al) Mar. 11 to 12, 1982. This publication describes improvement on the aforementioned C-axis dispersion by providing a titanium layer between the thin Co-Cr based layer and Alumite layer. However, the proposed improvement is still accompanied with the drawbacks that an increased internal stress arises, and the complexities of the method of manufacturing the subject Co-Cr based disc are experienced. Moreover, the thin Co-Cr based layer has to be prepared with a substrate maintained at a high temperature in order to increase a coercive force Hcv playing an important role in perpendicular magnetic recording. If, however, the thin Co-Cr based layer is formed with the substrate maintained at an extremely high temperature, cracks will appear in the Alumite layer due to a difference between the thermal expansions of the aluminum alloy and Alumite layer, depending on the thickness of said Alumite layer. As described above, many difficulties were encountered in the application of a surface-anodized aluminum alloy as a substrate of, for example, a Co-Cr based disc.

SUMMARY OF THE INVENTION

It is, accordingly, an object of this invention to provide an easily workable perpendicular magnetic-recording medium whose surface is polished with extremely high precision, and wherein a very satisfactory C-axis dispersion is ensured in a magnetic recording layer.

Another object of the invention is to provide a method of manufacturing said perpendicular magnetic-recording medium.

To attain the above-mentioned objects, a perpendicular magnetic-recording medium embodying this invention comprises a disc substrate, an amorphous alloy layer prepared from nickel (Ni) and phosphorus (P) and formed on said disc substrate, and whose surface is extremely smoothed, and a ferromagnetic Co-based perpendicular magnetic-recording layer formed on said surface-smoothed alloy layer.

When hardened, an alloy of nickel and phosphorus is rendered nonmagnetic and retains an amorphous state. The surface of the alloy layer formed on the disc substrate can be very finely smoothed by polishing. Such an extremely smooth surface condition is indispensable to high density magnetic recording. Deposition of a thin Co-Cr based layer on the above-mentioned Ni-P layer ensures a good C-axis dispersion. Moreover, the subject perpendicular magnetic-recording medium can be easily manufactured at low cost.

A method embodying this invention for manufacturing a perpendicular magnetic-recording medium comprises the steps of forming an amorphous alloy layer of nickel and phosphorus on a disc substrate, smoothing the surface of said alloy layer, and forming a ferromagnetic Co-based perpendicular magnetic-recording layer on the surface-smoothed alloy layer with the disc substrate maintained at a temperature of 120° to 250° C.

The above-mentioned manufacturing method enables a ferromagnetic Co-Cr based perpendicular magnetic-recording layer to be formed on an amorphous, extremely hard Ni-P alloy layer. In this case, it is necessary to maintain the disc substrate at a temperature of 120° to 250° C. If the temperature of the disc substrate falls below 120° C., it is impossible to ensure the satisfactory C-axis dispersion. Under such conditions, the coercive force Hcv is small, and the magnetic-recording layer is attached to the alloy layer with extremely low adhesivity. Conversely, when, the disc substrate is held at a higher temperature than 250° C., the coercive force Hcv is prevented from rising, gases are noticeably released, and the C-axis dispersion characteristics falls.

BRIEF DESCRIPTION OF THE DRAWINGS

The objects and advantages of this invention will be apparent from the following description taken in conjunction with the accompanying drawings in which.

DETAILED DESCRIPTION OF THE PREFERRED EMBODIMENTS

Figure 1:
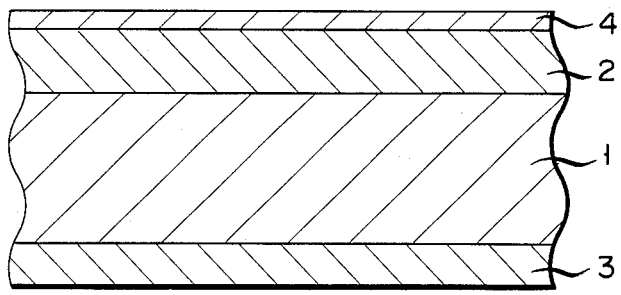
FIG. 1 is a cross sectional view of a perpendicular magnetic-recording medium according to a first embodiment of this invention.
Figure 2:
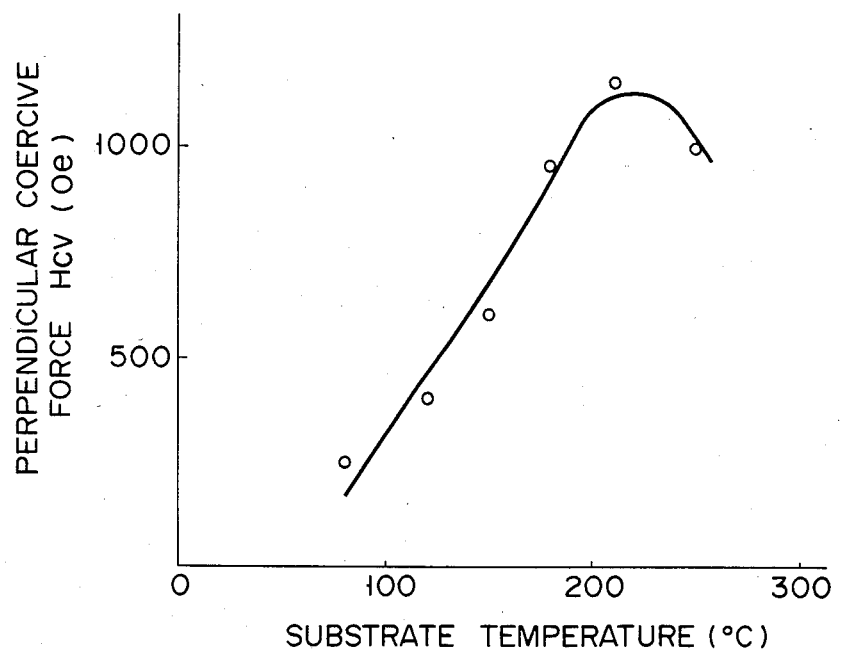
FIG. 2 is a curve diagram indicating the relationship between the substrate temperature and perpendicular coercive force Hcv.
Figure 3:
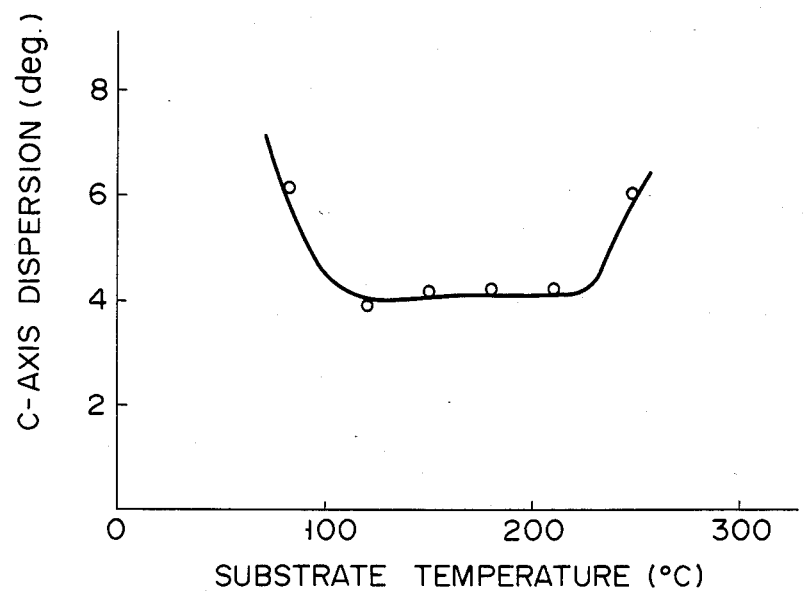
FIG. 3 is a curve diagram illustrating the relationship between the substrate temperature and C-axis dispersion.

A description may now be given with reference to FIG. 1 of a perpendicular magnetic-recording medium according to a first embodiment of this invention. The perpendicular magnetic-recording medium comprises a disc substrate 1, Ni-P layers 2 and 3 and thin Co-Cr based layer 4. The surface of the disc substrate 1 prepared from, for example, an aluminum alloy is polished with proper precision. Ni-P layers 2 and 3 are deposited on both sides of said aluminum alloy disc substrate 1 by means of, for example, electroless plating with a thickness of 50 microns. Said deposition of the Ni-P layers 2 and 3 eliminates the occurrence of an internal stress in the disc substrate. The Ni-P layers 2 and 3 are generally chosen to have a hardness of about 400, as counted by the Vickers hardness, though depending on the plating method and the concentration of phosphorus. The concentration of phosphorus is preferred to fall within the range of 5 to 25% (atomic %). While the constituent phosphorus has a concentration falling within the above-mentioned range, the Ni-P layers 2 and 3 remain amorphous and nonmagnetic and are extremely hardened by the solid solution hardening of the phosphorus. In the plating, it is not allowed to mix over 25% of phosphorus with nickel. If the content of phosphorus falls below 5%, the Ni-P layers 2 and 3 undesirably remain ferromagnetic and retain low hardness, though maintaining an amorphous state. Therefore, the phosphorus concentration is preferred to range between 10 and 20%. It is possible to elevate the hardness of said Ni-P layers 2 and 3 by heat treatment. According to this invention, the surface of the Ni-P layers 2 and 3, formed as described above, is polished with extremely high precision. The thin Co-Cr based layer 4 is sputtered as a magnetic recording layer, on the smoothed surface of the Ni-P layer 2, with a thickness smaller than 1 micron. Said sputtering is performed in an atmosphere of argon gas having a pressure of 5 mm Torr (0.665 Pa). In this case, the disc substrate 1 is maintained at a temperature of 120° to 250° C. To elevate the coercive force Hcv, the disc substrate 1 has to be maintained at as high a temperature as will be allowed. If the temperature of the disc substrate 1 falls below 120° C., it is impossible to fully elevate the coercive force Hcv, as seen from FIGS. 2 and 3. Under such conditions, a satisfactory C-axis dispersion cannot be ensured, and the magnetic-recording Co-Cr based layer is deposited on the Ni-P alloy layer with an extremely low adhesiveness. Conversely, if the temperature of the disc substrate 1 rises above 250° C., the coercive force Hcv drops, and gases are noticeably released from the substrate 1, leading to a decline in the C-axis dispersion characteristic.

Table 1 below sets forth the magnetic property of a thin Co-Cr based layer 4 of a magnetic disc manufactured in the aforementioned manner. Table 1 also indicates the properties of the conventional Co-Cr based magnetic disc.

| Phosphorus concentration | 17 atomic % |
| Substrate temperature | 180° C. |
| Pressure of an Ar atmosphere in which the Co—Cr based layer was formed | 3 mm Torr | then, the C-axis dispersion angle was set at about 3.5. Moreover, the perpendicular coercive force of the thin Co-Cr based layer 4 could be increased over 1000 Oe. Therefore, the perpendicular magnetic-recording medium of this invention has a fundamental property fully adapted for perpendicular magnetic recording.

In contrast, when a thin Co-Cr based layer is deposited on an Alumite layer formed on a disc substrate, the C-axis dispersion is extremely unsatisfactory. This means that a fundamental property suitable for perpendicular magnetic recording is not fully exhibited. When a thin Co-Cr based layer is mounted on an Alumite layer with a titanium layer interposed therebetween, the C-axis dispersion shows about the same pattern as a somewhat less satisfactory pattern than in the perpendicular magnetic-recording medium of this invention. In this case, however, it is necessary to take extra steps in manufacturing, for example, the titanium layer.

Figure 4:
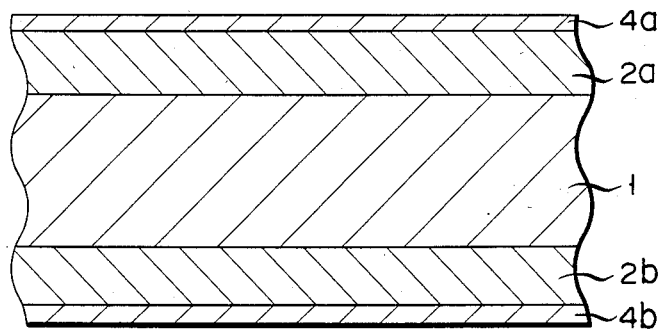
FIG. 4 is a cross sectional view of a perpendicular magnetic recording medium according to a second embodiment of the invention.

A description may now be made, with reference to FIG. 4, of a perpendicular magnetic-recording medium according to a second embodiment of this invention. With this second embodiment, Ni-P layers 2a and 2b are formed on both sides of the disc substrate 1. Thin Co-Cr based layers 4a and 4b are mounted on the corresponding Ni-P layers 2a and 2b. The parts of FIG. 4 the same as those of FIG. 1 are denoted by the same numerals, the description being omitted, therefore.

When a perpendicular magnetic-recording medium is constructed as described above, it is possible to form Co-Cr based layers 4a and 4b thus indicating a good C-axis dispersion characteristic on both sides of the disc substrate 1.

This invention is not limited to the foregoing embodiments. The amorphous Ni-P alloy layer may be replaced by an amorphous alloy layer of Co-P, Fe-P or Cu-P. The Co-P, Fe-P or Cu-P amorphous alloy layer is manufactured by electroplating. The material of the disc substrate need not be limited to an aluminum alloy. In other words, application of Ti, or an alloy thereof, ensures the same result as described above. It is advised to form the respective layers with a thickness and by a manufacturing method conformable to a prescribed specification.

TABLE I

| | | | Properties of Co—Cr layer | | | |
|---|---|---|---|---|---|---|
| | | Substrate | Thickness ($\mu$m) | Saturation magnetization (emu/cc) | Perpendicular coercive force (Oe) | C-axis dispersion angle (deg.) |
| Example | No. 1 | Ni—P/Al | 0.9 | 210 | 550 | 4.3 |
| | No. 2 | Ni—P/Al | 1.1 | 350 | 1200 | 4.7 |
| | No. 3 | Ni—P/Al | 0.9 | 450 | 1100 | 4.2 |
| Controls | No. 4 | Al$_2$O$_3$/Al | 0.9 | 380 | 520 | 8.8 |
| | No. 5 | Ti/Al$_2$O$_3$/Al | 1.1 | 370 | 800 | 5.2 |

This C-axis dispersion angle, given in Table 1 above, shows the half value width of a rocking curve measured by an X-ray pole-figure attachment. As seen from Table 1 above, the Co-Cr layer 4, involved in a magnetic disc-recording medium embodying this invention, has a better C-axis dispersion than in the conventional magnetic disc-recording medium. When the disc manufactured under the following conditions:

According to this invention, it is possible to form the Co-Cr based layer, whose surface is smoothed with high precision, by application of a Ni-P layer, thereby elevating the magnetic recording property of the subject perpendicular magnetic-recording medium. Moreover, the Co-Cr based layer can be directly mounted in the Ni-P layer without inserting an intermediate layer of, for example, titanium. This enables a disc recording medium, adapted for perpendicular magnetic recording, to be stably manufactured by a very simple process and at a low cost.

What is claimed is:

1. A perpendicular magnetic-recording medium, comprising:
   a disc substrate;
   an amorphous alloy layer of nickel (Ni) and phosphorus (P) which is formed on said disc substrate and whose surface is smoothed with high precision, said amorphous alloy layer containing 5–25 atomic percent of phosphorus; and
   a ferromagnetic Co-Cr based perpendicular magnetic-recording layer formed on the smoothed surface of said amorphous alloy layer.

2. The perpendicular magnetic-recording medium, according to claim 1, wherein said disc substrate is prepared from one selected from the group consisting of aluminum, titanium, an alloy of aluminum and an alloy of titanium.

3. The perpendicular magnetic-recording medium, according to claim 1, wherein said amorphous alloy layer and perpendicular magnetic-recording layer are formed on each side of the disc substrate in the order mentioned as counted from below.

4. A perpendicular magnetic-recording medium, comprising:
   a disc substrate;
   an amorphous alloy layer prepared by alloying phosphorus (P) with at least one metal selected from the group consisting of cobalt (Co), iron (Fe), and copper (Cu), and formed on said disc substrate, the surface of said amorphous alloy layer being smoothed with high precision; and
   a ferromagnetic Co-Cr based perpendicular magnetic-recording layer formed on the smoothed surface of said amorphous alloy layer.

5. The perpendicular magnetic-recording medium, according to claim 4, wherein said disc substrate is prepared from one selected from the group consisting of aluminum, titanium, an alloy of aluminum and an alloy of titanium.

6. The perpendicular magnetic-recording medium, according to claim 4, wherein said amorphous alloy layer and perpendicular magnetic-recording layer are formed on each side of said disc substrate in the order mentioned as counted from below.

7. The perpendicular magnetic-recording medium according to claim 1, wherein said amorphous Ni-P alloy layer is 50 microns thick.

8. The perpendicular magnetic-recording medium according to claim 1, wherein the phosphorus concentration in said amorphous nickel-phosphorus alloy layer ranges between 10 and 20 atomic percent.

* * * * *